United States Patent [19]

Kachidurian

[11] 4,157,909
[45] Jun. 12, 1979

[54] APPARATUS FOR FORMING MERCURY-FILLED CAPILLARY TUBES

[75] Inventor: Adam Kachidurian, Newton, N.J.

[73] Assignee: Burroughs Corporation, Detroit, Mich.

[21] Appl. No.: 900,422

[22] Filed: Apr. 27, 1978

[51] Int. Cl.$^2$ .................... C03B 23/00; C03B 23/04
[52] U.S. Cl. ........................................ 65/269; 65/270; 65/272; 65/276; 65/279; 65/283; 65/292; 65/108; 65/113; 65/DIG. 9
[58] Field of Search ............... 65/292, 276, 279, 283, 65/DIG. 9, 108, 113, 269, 272, 270

[56] References Cited
U.S. PATENT DOCUMENTS

| | | | |
|---|---|---|---|
| 696,467 | 4/1902 | McBerty | 65/DIG. 9 |
| 1,721,570 | 7/1929 | Millar | 65/276 X |
| 2,282,993 | 5/1942 | Dichter | 65/283 X |
| 2,835,079 | 5/1958 | Camarata et al. | 65/272 X |
| 3,619,158 | 11/1971 | Akhunuv et al. | 65/272 X |
| 3,852,054 | 12/1974 | Dichter | 65/270 X |

Primary Examiner—S. Leon Bashore
Assistant Examiner—Frank W. Miga
Attorney, Agent, or Firm—Kevin R. Peterson; Robert A. Green; Edward J. Feeney, Jr.

[57] ABSTRACT

The disclosure is of apparatus including two pairs of metal gripping blocks held together by a spring and mounted adjacent to wedge blocks carrying wedges for opening each pair. An operating plate is provided which drives the apparatus to cause the wedge blocks to open the gripping blocks to permit a length of capillary tubing filled with mercury to be inserted between the pairs of gripping blocks. The apparatus is then driven to cause the tubing to pass through a flame positioned to melt the tubing at a desired location and to form two separate seal portions at this location which are gripped by the two gripping blocks; and, on the next cycle, when the gripping blocks are opened, the portion of the tubing which is the desired capsule is released from its pair of gripping blocks and fed to a suitable receiver.

7 Claims, 9 Drawing Figures

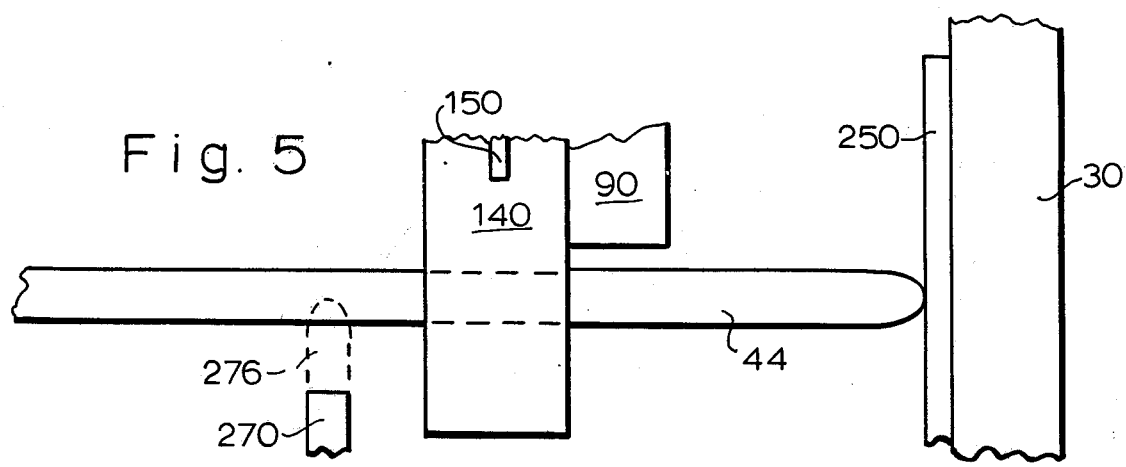
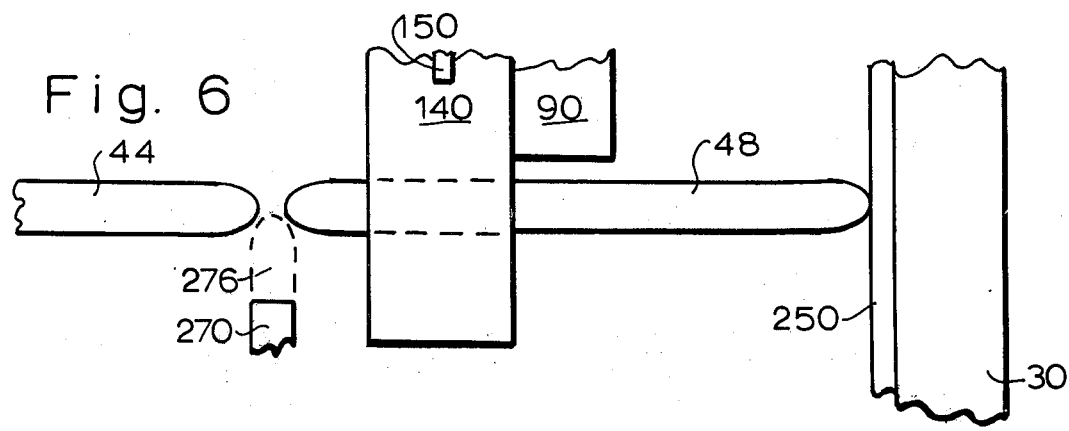
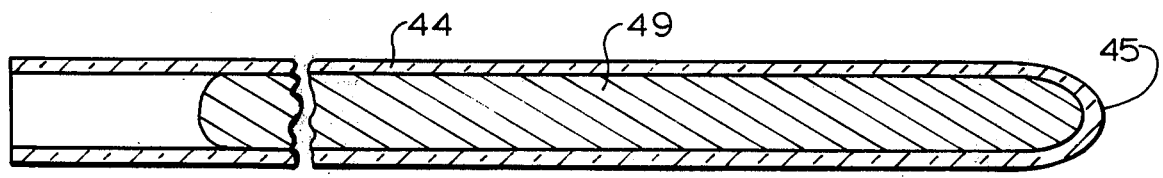
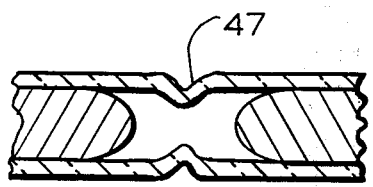
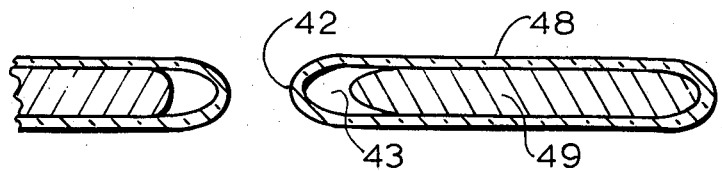

APPARATUS FOR FORMING MERCURY-FILLED CAPILLARY TUBES

BACKGROUND OF THE INVENTION

Small-diameter capillary tubes filled with mercury are presently used in gas-filled display panels to provide a source of mercury which is released from the capsule at a desired time in the manufacturing process. These capillaries are used in large numbers in multi-register panels such as SELF-SCAN panels, and, at the present time, there is no known apparatus for making such capsules economically in large numbers.

SUMMARY OF THE INVENTION

Briefly, apparatus embodying the invention includes clamping means adapted to be opened to permit a length of mercury-filled capillary tubing to be inserted therein and to be gripped thereby. The apparatus also includes means for heating the tubing to melt and separate a desired length of capillary from the main tubing.

DESCRIPTION OF THE DRAWINGS

FIG. 5 is a side elevational view of a portion of the apparatus of the invention at one stage in its operation;

FIG. 6 is a view similar to that of FIG. 5 showing the apparatus in a second stage in its operation;

FIG. 7 is a sectional view of a mercury-filled tube which is processed by the apparatus of the invention;

FIG. 8 is a sectional view of a portion of the tube of FIG. 7 at one stage in its processing; and FIG. 9 shows the tube of FIG. 8 separated into two portions including the desired mercury-filled capillary.

DESCRIPTION OF THE PREFERRED EMBODIMENTS

Figure 1:
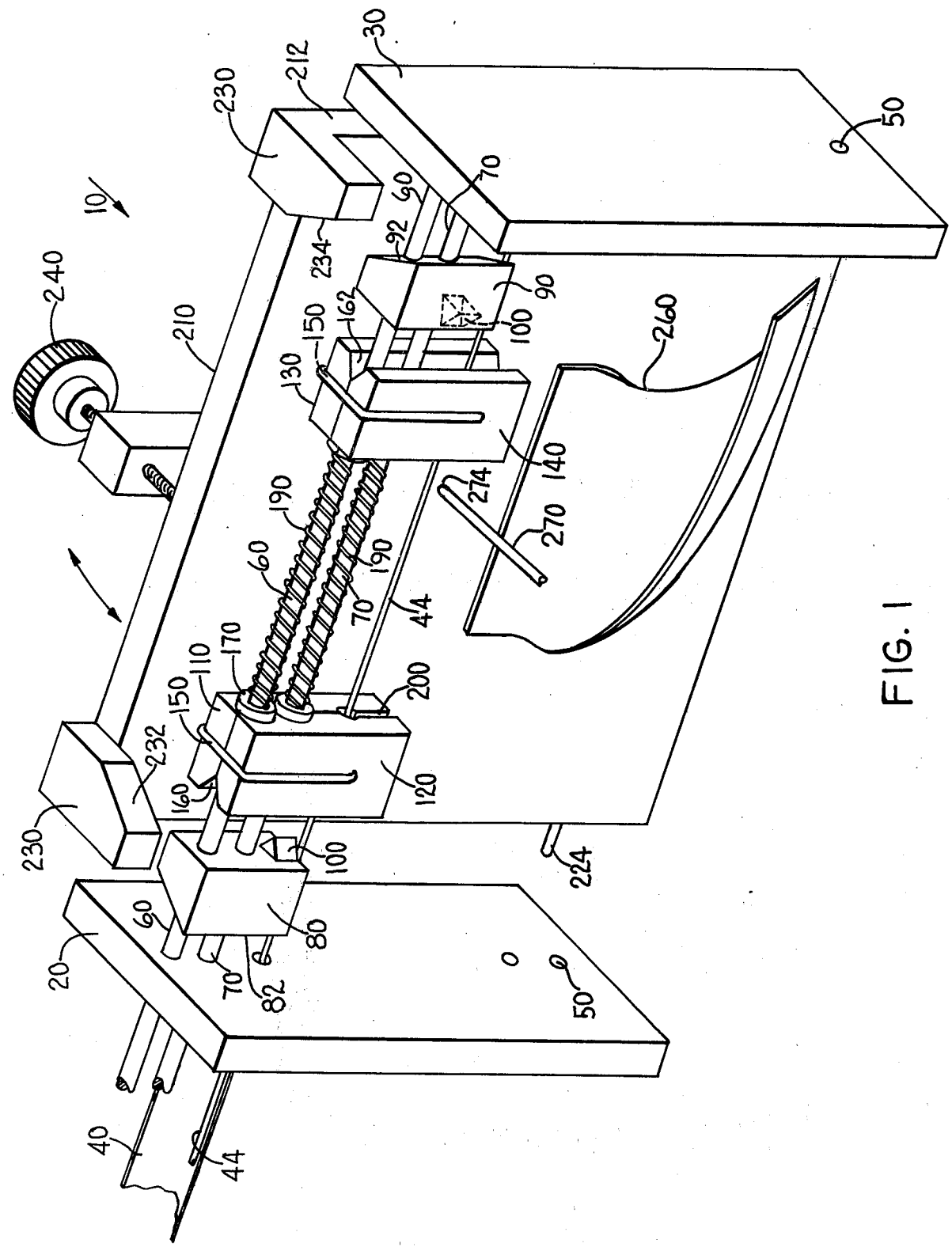
FIG. 1 is a perspective view of the invention.
Figure 2:
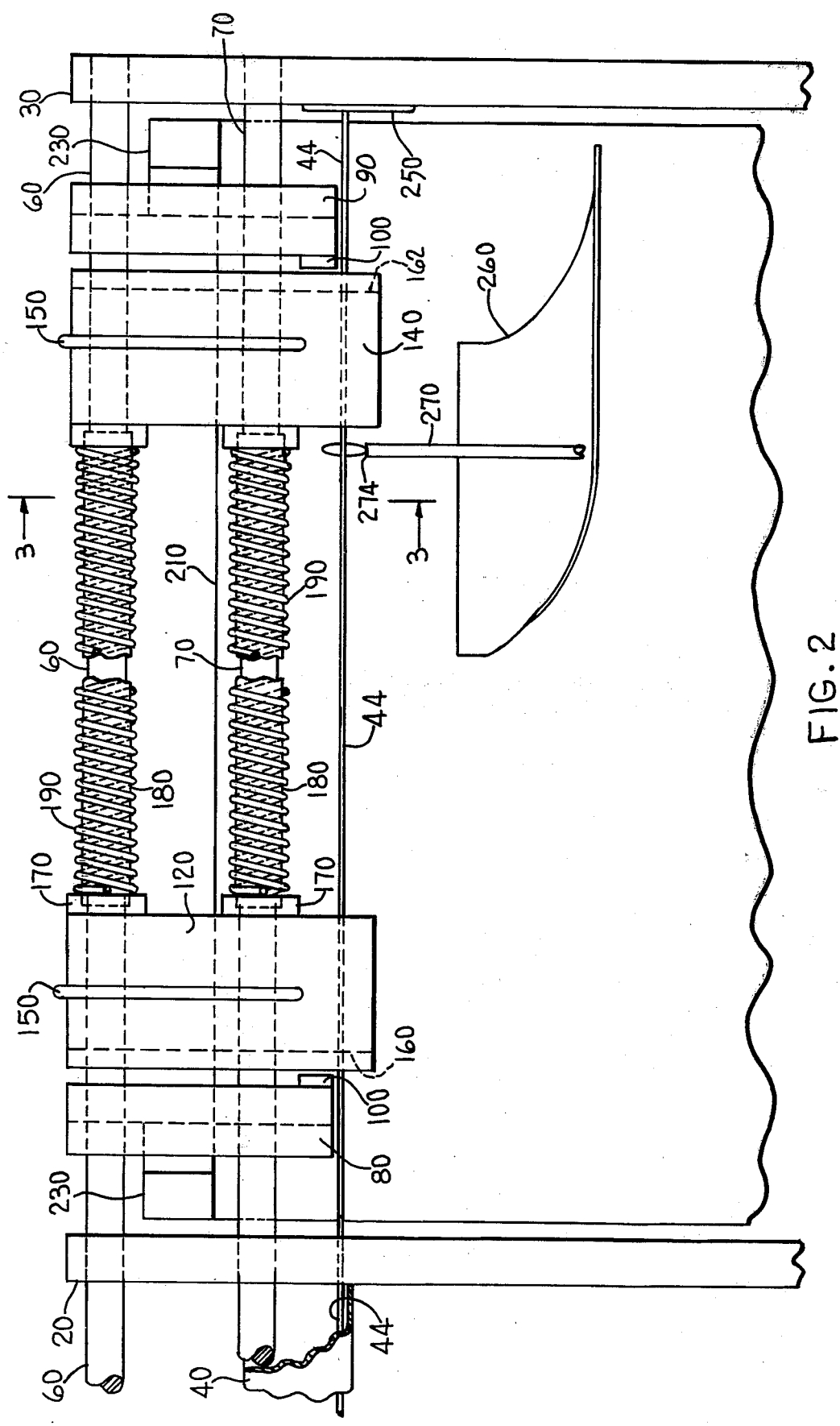
FIG. 2 is a front elevational view of a portion of the apparatus shown in FIG. 1.
Figure 3:
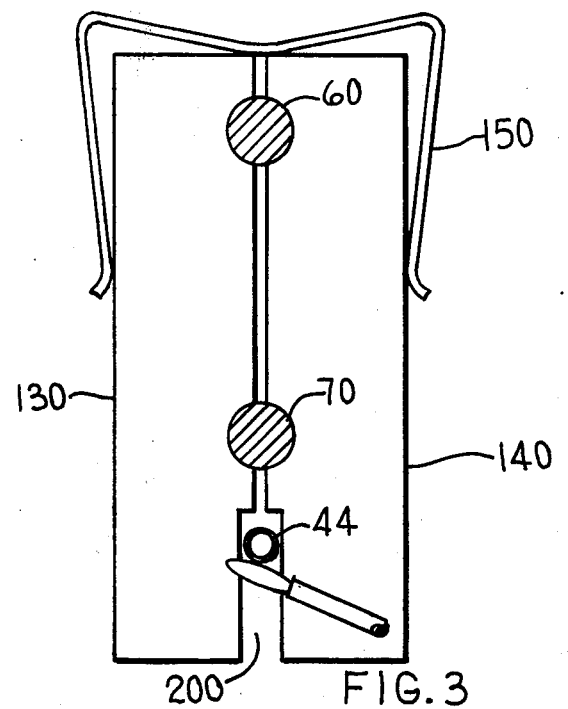
FIG. 3 is a sectional view along the lines 3—3 in FIG. 2.

Apparatus 10 embodying the invention includes a pair of rigid spaced-apart side plates 20 and 30, between which the operating members are supported. An elongated feed trough 40, for glass tubing 44 to be processed, is secured to the left hand plate 20, and the entire assembly of side plates and feed trough is pivotally mounted on pins 50 which pass through the lower ends of the plates 20 and 30. Two horizontal upper and lower support shafts 60 and 70, respectively, extend between the plates 20 and 30 and are suitably secured thereto. Two spaced-apart wedge blocks 80 and 90 are slidably mounted on the shafts 60 and 70 adjacent to the inner facing surfaces of the side plates 20 and 30. The blocks 80 and 90 carry on their facing surfaces, wedges 100 positioned beneath the lower shaft 70. The blocks 80 and 90 have rear surfaces 82 and 92 which are tapered, for a purpose to be described.

A left hand pair of clamping blocks 110 and 120 and a right hand pair of clamping blocks 130 and 140 are slidably mounted on the shafts 60 and 70, and the members of each pair are held together by a spring 150. The blocks of each pair are oriented vertically, and they include rear surfaces which are tapered, along the vertical gap between them to provide V-shaped notches 160 and 162 which the wedges 100 can enter to spread the members of the clamping blocks apart against the force of the springs 150. Between the clamping block pairs 110, 120 and 130, 140, each shaft 60 and 70 is provided with a cylindrical sleeve 180, the ends of which enter collars 170 secured to the facing surfaces of the clamping block pairs. Cylindrical springs 190 are disposed, under tension, on the sleeves 180 and tend to force the two pairs of clamping blocks apart from each other. The pairs of clamping blocks also include a narrow slot 200 between the lower facing surfaces of the pairs of clamping blocks to receive the tubing 44. The slots 200 are disposed below shaft 70 and are formed suitably cutting away portions of the inner surfaces of the blocks 110, 120 and 130, 140.

The apparatus 10 also includes a generally large-area flat plate 210 disposed generally parallel to that shafts 60 and 70 extending between side plates 20 and 30. The plate is pivotally supported on posts or pins 224 secured to the lower ends of the side walls 212 of the base 210. The plate 210 carries, at its upper ends, two plates 230 which extend inwardly toward the shafts 60 and 70. The arms 230 are positioned between the side plates 20 and 30 and the wedge blocks 80 and 90, and they include tapered inner surfaces 232 and 234 which are adapted to engage the correspondingly tapered surfaces 82 and 92, respectively, of the wedge blocks. An adjustable stop 240 is secured to the rear surface of plate 210 to limit its rearward movement.

A leaf spring 250 is mounted on the inside surface of the right hand side plate 30 in alignment with the slot 200 in blocks 130 and 140 so that the right hand end of tubing 44 can contact the spring. A chute 260 is disposed to receive formed capsules 48 as they are separated from the tubing 44.

Figure 4:
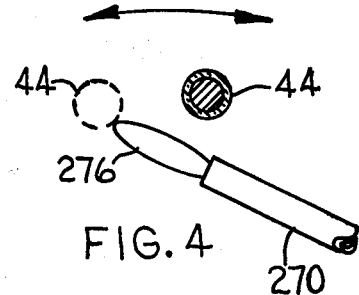
FIG. 4 is a side elevational view of a portion of the apparatus shown in FIG. 3 and illustrating the mode of operation thereof.

A gas jet 270 is positioned adjacent to the right hand end of the apparatus 10, with its nozzle 274 to the rear of tube 44. The gas jet is positioned and aimed so that the tube can be moved rearwardly to a position represented by the dash lines in FIG. 4, at which the flame 276 can soften the tube.

In operation of the apparatus 10, the side plates 20 and 30, and all of the associated apparatus carried thereby are driven rearwardly from the normal or rest position to engage plate 210 so that the brackets 230 enter the spaces between the wedge blocks 80 and 90 and the side plates 20 and 30. This action forces the blocks 80 and 90 toward each other and forces the wedges 100 between the members of each pair of gripping blocks which are spread apart thereby. The tube 44, which is filled with mercury, is now fed along the trough 40, through the left side plate 20, beneath the wedge block 80, and through the slot 200 in the gripping blocks 110 and 120 all the way to the right through the slot 200 in blocks 130 and 140 and up against the leaf spring 250 which is flexed to the right by the tube (FIG. 5). The tube 44 is in the position represented by the dash lines in FIG. 4. In this position, it is softened by the flame 276.

After a suitable softening period, the plates 20 and 30 and their associated apparatus are now driven forwardly slowly, away from plate 210 and back to the rest or normal position. As the tube 44 passes slowly through the gas flame, it is separated into two parts, and the adjacent ends of the two parts thus formed are fused together, as shown in FIG. 6. The right hand portion of the tube, thus formed, is the desired mercury capsule 48. Now, the cycle is repeated, and the plates 20 and 30 and their assembly are driven rearwardly again. When the assembly moves rearwardly to contact plate 210 and when the gripping blocks are opened again by the wedges 100, the flexed leaf spring 250 flies to the left and ejects the formed mercury capsule into the chute 260 and into a suitable collector. The tube 44 is again fed to the right to spring 250, and another capsule is formed as described above.

Considering the mercury-filled tube and the details of the capsule-forming process, and referring to FIGS. 7-9, initially, the leading or right-hand end of the tube 44, as seen in FIGS. 1 and 5, is closed off by heating, and the tube is filled with mercury 49, except for a few inches at its left-hand end to allow for expansion during the various operations. The tube 44 has an outside diameter of about thirteen to sixteen mils in one embodiment. First, the tube is driven rearwardly to a position where it is just touched by the flame, and it is softened by the flame, and the liquid mercury vaporizes at the heated area. Thus, the liquid mercury is forced to the left and right of the heated area 47, as shown in FIG. 8. Vacuum exists in the heated area 47 due to the high temperature in this area. When the tube 44 is again passed through the heating flame to separate the desired capsule 48 from the main body of the tube, the heat holds the liquid portion of the mercury away from the seal area which itself is filled with mercury vapor. The final capsule, as shown in FIG. 9, contains a quantity of mercury 49 and a region 43 which contains a partial pressure of mercury vapor at room temperature. Because of the manner in which this capsule is formed, the desired hermetic seal is achieved at the just-formed end 42 of the capsule. Since the capsule contains space 43, when it is placed in a display panel and it is heated due to various manufacturing operations on the panel, it does not shatter prematurely because the heated liquid mercury can expand into the space 43.

What is claimed is:

1. Glass capsule-forming apparatus comprising
   horizontally extending shaft support means,
   two pairs of gripping blocks mounted on said shaft means, each pair including two parallel, vertically oriented blocks having said shaft means disposed between them and with spring means clamping the two blocks of each pair together,
   first wedges slidably mounted on said shaft means adjacent to each pair of gripping blocks for separating the individual blocks of each pair of gripping blocks from each other,
   said first wedges each being slidable, on said shaft means, toward and away from an adjacent pair of gripping blocks, the movement of a wedge toward and into engagement with a pair of gripping blocks serving to spread apart the individual blocks of the pair, the movement of a wedge away from the adjacent pair of gripping blocks serving to permit the individual blocks of the pair to come together,
   a pair of vertically extending spaced-apart plates supporting said shaft means, said pairs of gripping blocks and said wedges between them, said plates being pivotable forwardly and rearwardly about a first horizontal axis disposed adjacent to their lower ends,
   means carrying second wedges positioned behind said first wedges and located to engage said first wedges and drive them toward their adjacent pair of gripping blocks, said means being pivotable about a second horizontal axis positioned adjacent to said first horizontal axis,
   said pairs of gripping blocks including aligned slots for receiving a horizontally extending mercury-filled tube from which mercury-filled capillaries are to be formed, and
   heating means disposed adjacent to one of said pairs of gripping blocks and positioned to direct heat onto said mercury-filled tube when said tube is moved back and forth with respect to said heating means.

2. The apparatus defined in claim 1 and including a trough supporting said tube and positioned to permit said tube to extend along said apparatus in said aligned slots in said pairs of gripping blocks.

3. The apparatus defined in claim 1 and including a capsule-receiver disposed beneath said apparatus to receive formed capsules.

4. The apparatus defined in claim 1 wherein said heating means is a gas jet.

5. The apparatus defined in claim 1 wherein said mercury-filled tube is adapted to move along a path toward said heating apparatus, one of said spaced-apart plates facing the leading end of said tube as it moves toward said heating means, and carrying a leaf spring secured to said one of said spaced-apart plates and positioned to be engaged by and flexed by the leading end of said tube when it is in capsule-forming position.

6. The apparatus defined in claim 1 and including springs on said shaft support means and disposed between said two pairs of gripping blocks and urging said pairs of gripping blocks away from each other.

7. Glass capsule-forming apparatus comprising
   horizontally extending first and second shafts disposed parallel to each other, with one being disposed vertically above the other,
   first and second vertically extending spaced-apart side plates disposed transverse to said shafts and supporting said shafts, said first and second plates having inner and outer surfaces, said first and second plates being pivotably mounted on a horizontal axis,
   said first side plate having an aperture through which a glass tube is filled with a substance extends with its leading end extending toward said second side plate,
   means secured to the outer surface of said first side plate for supporting said glass tube as it is fed toward said second plate,
   first and second pairs of gripping blocks slidably mounted on said first and second shafts, each pair of gripping blocks including two parallel, vertically oriented blocks, with spring means clamping the two blocks of each pair together,
   helical springs mounted on said first and second shafts and positioned to urge said pairs of gripping blocks away from each other,
   first wedges slidably mounted on said first and second shafts adjacent to each pair of gripping blocks for separating the individual blocks of each pair of gripping blocks from each other, each wedge being positioned between a pair of gripping blocks and a side plate,
   said first wedges each being slidable, on said shafts, toward and away from an adjacent pair of gripping blocks, the movement of a wedge toward and into engagement with a pair of gripping blocks serving to spread apart the individual blocks of the pair, the movement of a wedge away from the adjacent pair of gripping blocks serving to permit the individual blocks of the pair to come together, said pairs of gripping blocks including aligned slots for receiving said horizontally extending glass tube from which capsules are to be formed, each pair of gripping blocks gripping the glass tube when the individual blocks of each pair are held together, a third plate oriented generally vertically and generally parallel to said first and second shafts and positioned to the rear of said shafts and extending between said first and second plates, said third plate carrying second wedges positioned behind said first wedges, each second wedge being positioned between a first wedge and the adjacent side plate and located to engage said first wedges and drive them toward their adjacent pair of gripping blocks, said third plate being pivotable about a horizontal axis, and heating means disposed adjacent to one of said pairs of gripping blocks and positioned to direct heat onto said glass tube when said tube is moved back and forth, rearwardly and forwardly, with respect to said heating means due to the pivoting of said first and second plates about a horizontal axis.

* * * * *